United States Patent
Durham et al.

(10) Patent No.: US 7,954,109 B1
(45) Date of Patent: *May 31, 2011

(54) SYSTEMS AND METHODS FOR TIME BASED SORTING AND DISPLAY OF CAPTURED DATA EVENTS IN A MULTI-PROTOCOL COMMUNICATIONS SYSTEM

(75) Inventors: Douglas Durham, Sunnyvale, CA (US); Dominic Coupal, Santa Clara, CA (US); Andrew J. Milne, Sierra Madre, CA (US); Santosh Ulkande, Santa Clara, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 1442 days.

This patent is subject to a terminal disclaimer.

(21) Appl. No.: 10/764,218

(22) Filed: Jan. 23, 2004

Related U.S. Application Data

(60) Provisional application No. 60/442,608, filed on Jan. 24, 2003, provisional application No. 60/442,607, filed on Jan. 24, 2003.

(51) Int. Cl.
 G06F 9/44 (2006.01)
 G06F 15/16 (2006.01)
(52) U.S. Cl. .................................. 719/318; 709/224
(58) Field of Classification Search .................. 719/318; 709/224
 See application file for complete search history.

(56) References Cited

U.S. PATENT DOCUMENTS

| | | | |
|---|---|---|---|
| 5,373,501 A | 12/1994 | Roland | |
| 5,535,193 A | 7/1996 | Zhang | |
| 5,590,116 A | 12/1996 | Zhang | |
| 5,748,098 A * | 5/1998 | Grace | 370/242 |
| 5,850,388 A * | 12/1998 | Anderson et al. | 370/252 |
| 5,896,427 A | 4/1999 | Muntz et al. | |
| 5,920,711 A | 7/1999 | Seawright et al. | |
| 5,982,753 A | 11/1999 | Pendleton et al. | |
| 6,070,248 A | 5/2000 | Yu et al. | |
| 6,125,404 A * | 9/2000 | Vaglica et al. | 713/375 |
| 6,148,420 A | 11/2000 | Schlater et al. | |
| 6,269,136 B1 | 7/2001 | Hansen et al. | |
| 6,335,931 B1 | 1/2002 | Strong et al. | |
| 6,370,159 B1 | 4/2002 | Eidson | |
| 6,507,923 B1 | 1/2003 | Wall et al. | |
| 6,526,044 B1 | 2/2003 | Cookmeyer et al. | |
| 6,665,316 B1 | 12/2003 | Eidson | |
| 6,707,794 B1 * | 3/2004 | Leong et al. | 370/241 |
| 6,931,574 B1 | 8/2005 | Coupal et al. | |
| 7,003,781 B1 * | 2/2006 | Blackwell et al. | 719/327 |

(Continued)

OTHER PUBLICATIONS

U.S. Appl. No. 10/764,095, filed Jan. 23, 2004, Durham, et al.

(Continued)

Primary Examiner — H. S. Sough
Assistant Examiner — Abdou K Seye
(74) Attorney, Agent, or Firm — Matthew A. Pequignot; Pequignot + Myers LLC

(57) ABSTRACT

Systems, device and methods are provided for displaying time sorted data events captured in a multi-protocol communications system. Initially, data events are captured in connection with detection of one or more trigger conditions, and each captured data event includes a clock timestamp. The captured data events are then sorted and displayed by a graphical user interface according to their respective clock timestamp. Once the data events have been sorted and displayed, then the temporal relationships and causal relationships, if any, between and among the captured data events can be determined.

27 Claims, 7 Drawing Sheets

U.S. PATENT DOCUMENTS

| | | |
|---|---|---|
| 7,042,908 B1 | 5/2006 | Mayer |
| 7,133,416 B1 | 11/2006 | Chamdani et al. |
| 7,173,943 B1 | 2/2007 | Borchew et al. |
| 7,228,348 B1 | 6/2007 | Farley et al. |
| 7,259,736 B2 | 8/2007 | Dunn et al. |
| 2002/0136232 A1 | 9/2002 | Dudziak |
| 2002/0194393 A1* | 12/2002 | Hrischuk et al. ............. 709/318 |
| 2003/0074440 A1* | 4/2003 | Grabarnik et al. ............ 709/224 |
| 2004/0049706 A1 | 3/2004 | Strong |
| 2004/0054776 A1 | 3/2004 | Klotz et al. |
| 2004/0233910 A1* | 11/2004 | Chen et al. ................ 370/395.5 |
| 2005/0060402 A1 | 3/2005 | Oyadomari et al. |

OTHER PUBLICATIONS

U.S. Appl. No. 10/764,059, filed Jan. 23, 2004, Durham, et al.
U.S. Appl. No. 10/764,095, Mail Date Aug. 9, 2007, Office Action.
U.S. Appl. No. 10/764,095, Mail Date Apr. 16, 2008, Office Action.
U.S. Appl. No. 10/764,059, Mail Date Aug. 7, 2008, Restriction Requirement.
U.S. Appl. No. 10/764,059, Mail Date Sep. 26, 2008, Office Action.
U.S. Appl. No. 10/764,059, Mail Date May 27, 2009, Office Action.
U.S. Appl. No. 10/764,059, Mail Date Dec. 18, 2009, Office Action.
U.S. Appl. No. 10/764,095, Mail Date Apr. 14, 2009, Office Action.
U.S. Appl. No. 10/764,095, Mail Date Nov. 27, 2009, Office Action.

* cited by examiner

SYSTEMS AND METHODS FOR TIME BASED SORTING AND DISPLAY OF CAPTURED DATA EVENTS IN A MULTI-PROTOCOL COMMUNICATIONS SYSTEM

RELATED APPLICATIONS

This application claims the benefit of U.S. Provisional Patent Application Ser. No. 60/442,608, entitled SORTING OF DATA USING TIMESTAMPS TO CAPTURE AND ANALYZE DATA OF MULTIPLE PROTOCOLS, and filed on Jan. 24, 2003, as well as the benefit of U.S. Provisional Patent Application Ser. No. 60/442,607, entitled SYNCHRONIZATION OF CARDS FOR CAPTURING AND ANALYZING DATA OF MULTIPLE PROTOCOLS, and filed on Jan. 24, 2003, both of which are incorporated herein in their respective entireties by this reference.

BACKGROUND OF THE INVENTION

1. The Field of the Invention

The present invention relates to the identification, capture and analysis of data transmitted over a data network. More specifically, embodiments of the present invention are concerned with systems and methods for time based sorting and display of captured data events that collectively represent a variety of different communications protocols.

2. Related Technology

Many data communications systems use a variety of different data transmission mechanisms to enable communication between and among associated subsystems. In general, the type of data transmission mechanism employed in a given situation is determined with reference to the particular tasks desired to be accomplished in connection with that transmission mechanism and associated systems. Each different transmission mechanism, in turn, is associated with a particular transmission, or communication, protocol that defines various parameters concerning the transmission of data in connection with the transmission mechanism. Such communication protocols commonly specify, for example, the manner in which data is encoded onto a transmission signal, the particular physical transmission media to be used with the transmission mechanism, link layers and other attributes.

As suggested above, a single data communications system may use multiple different transmission mechanisms and protocols. As an example, an enterprise may employ a communications system that uses five different data communications protocols, each adapted for a particular situation, wherein the five protocols may include: a first protocol for a high speed, inexpensive short-haul connection on the computer motherboard; a second high-bandwidth protocol for data center transmissions; a third protocol that is suited for efficiently transmitting information across the enterprise local area network ("LAN"); a fourth protocol adapted for high bandwidth, long haul applications; and, finally, a fifth transmission protocol suited for data transmission to high performance disk drive storage systems. Thus, the typical communications system comprises a patchwork of different subsystems and associated communications protocols.

In this way, a communications system can be created that makes maximum and efficient use of the functionalities and capabilities associated with various different communications protocols. Further, advances in communications technology, coupled with declining costs, enable such communications systems to be implemented in a relatively cost effective fashion.

While communications systems that include components, devices and subsystems of varying protocols are able to exploit the respective strengths and useful features associated with each of the protocols, such multiple protocol systems can be problematic in practice. This is especially true where problem identification, analysis and resolution are concerned. In particular, the use of multiple communications protocols within the bounds of a single communications system greatly complicates the performance of such processes.

For example, as network data moves from a point of origin to a destination, by way of communication links, or simply "links," the data passes through a variety of devices collectively representing multiple protocols. Typically, each such device modifies the network data so that the data can be transmitted by way of a particular link. However, modification of the data in this way often causes errors or other problems with the data. Such errors may occur as the result of various other processes and conditions as well. Thus, the various communication links in a communications system are particularly prone to introduce, or contribute to the introduction of, data errors. Moreover, data errors and other problems present at one location in the data stream may cause errors or other problems to occur at other locations in the data stream and/or at other points in the communications system and associated links.

One approach to problem identification, analysis and resolution in communications networks involves capturing a portion of the network data traffic. The captured data can then be retrieved for review and analysis. In some cases, such data capture is performed in connection with a multi-link protocol analyzer that includes various hardware and software elements configured and arranged to capture data from one or more communications links in the communications system, and to present the captured data by way of a graphical user interface.

Generally, such protocol analyzers, or simply "analyzers," capture data traffic in the communications system over a defined period of time, or in connection with the occurrence of predefined events. Use of a multi-link protocol analyzer, for example, allows a network administrator to track the progress of selected data as that data moves across the various links in the communications system. Corrupted or altered data can then be identified and traced to the problem link(s), or other parts of the communications system.

Implementation of this functionality, however, requires that a causal relationship be identified between the data captured by way of the various links. In particular, in order to classify event "A" as a possible cause of event "B," it must be shown that event "A" occurred prior in time to event "B." If event "A," or at least a portion of event "A," did not occur prior in time to event "B," then event "A" cannot be the cause of event "B." Accordingly, identification of a causal relationship cannot be performed without knowledge of the order, in time, that the data of interest arrives at a particular destination, or destinations, in the communications system. That is, causal links or relationships between data events occurring on different links within the communications system cannot be identified until the temporal relationship between those data events is known. As discussed below, typical analyzers present a number of problems in this regard.

For example, identification of such causal relationships between data events is complicated by the fact that the data is transmitted at different rates over the different links. As noted earlier, the differing data transmission rates stem from the fact that multiple data communications protocols are employed within a single communications system, where each protocol has a different associated data rate and transmission frequency. For example, Fibre Channel systems operate at a frequency of about 2 GHz, Infiniband systems operate at a frequency of about 2.5 GHz times 4, and Gigabit Ethernet systems operate at a frequency of about 1 GHz.

Thus, the speed with which a particular portion of data can be transmitted is a function of the frequency of the associated protocol. A comparison of the Gigabit Ethernet ("GigE") and Infiniband protocols serves to illustrate this point. As noted above, GigE systems operate at a frequency of about 1 GHz, while Infiniband systems operate at a frequency of about 2.5 GHz, so that the same amount of information takes about 2.5 times longer to transmit in a GigE system as in an Infiniband system.

In typical data capture operations, the clock of one of the protocols is used as a basis for timestamping of the captured data. The timestamping is performed so that the temporal relationships between captured data events can be determined. However, because each protocol in multi-protocol systems has a different associated clock, the sorting of captured data based upon a timestamp made with reference to a particular protocol clock may not be adequate to enable determination of causal relationships between captured data events. This is especially true where it is desired to determine whether an inter-protocol relationship exists between, for example, a data event associated with the Infiniband portion of the system, and a data event associated with the GigE portion of the system.

In the aforementioned example, the GigE protocol is relatively more "coarse" than the Infiniband protocol in that, for a given time period, a GigE system clock increments fewer times than does the Infiniband system clock. Thus, a particular data event may appear relatively longer, or shorter, than another data event depending upon which clock is selected as the basis for the timestamps. For example, a 2 clock increment GigE data event would be 5 clock increments long in the Infiniband protocol, so that while the respective data events appear to have different lengths, relative to their corresponding protocols, the data events actually have the same time duration in absolute terms.

As the foregoing suggests, the different data rates associated with the transmission protocols also compromise the ability to determine start and stop times of particular data events. Of course, this situation is further aggravated where multiple additional transmission protocols are employed in a communications system. Thus, in a system that employs multiple transmission protocols, the protocol-based timestamping of multiple captured data events can make it difficult to make accurate and reliable determinations as to absolute and relative data event lengths, and data event start and finish times. As a result, the ability to identify temporal relationships between data events, such as is required to facilitate time-based sorting and analysis of those data events, may be compromised.

In view of the foregoing, and other, problems in the art, what is needed are systems and methods for time based sorting and display of captured data events, each of which may be associated with a different transmission protocol, in such a way that temporal and causal relationships between and among the captured data events can be reliably and accurately identified. Further, at least some implementations of such systems and methods should employ a reference clock in connection with the capture and time based sorting of data events.

BRIEF SUMMARY OF AN EXEMPLARY EMBODIMENT OF THE INVENTION

Generally, embodiments of the present invention are concerned with systems and methods for time based sorting and display of captured data events that collectively represent a variety of different communication protocols.

In one exemplary implementation, a method is employed for processing data events captured in a communications system. Initially, one or more data events, each of which may be associated with a different communication protocol, are captured in response to the detection of a trigger condition. Each of the captured data events is timestamped in correspondence with a predetermined clock. The captured and timestamped data events are then sorted according to their respective clock timestamps. Once the data events have been sorted and displayed, the temporal and causal relationships, if any, between and among the captured data events can then be determined.

In this way, a user can accurately and reliably determine the nature and existence of any relationships between and among captured data events in a multiple protocol system. Among other things, this information can be used to trace problems to their sources and to help identify corrective actions that may be required. These, and other, aspects of exemplary embodiments of the invention will become more fully apparent from the following description and appended claims.

BRIEF DESCRIPTION OF THE DRAWINGS

In order that the manner in which the advantages and features of the invention are obtained, a particular description of the invention will be rendered by reference to specific embodiments thereof which are illustrated in the appended drawings. Understanding that these drawings depict only exemplary embodiments of the invention and are not, therefore intended to be considered limiting of its scope, the invention will be described and explained with additional specificity and detail through the use of the accompanying drawings in which.

DETAILED DESCRIPTION OF EXEMPLARY EMBODIMENTS OF THE INVENTION

Generally, exemplary embodiments of the present invention are concerned with systems and methods for time based sorting and display of captured data events that collectively represent a variety of different communications protocols. As disclosed herein, such systems and methods are directed to the sorting of captured data events based upon clock timestamps associated with each of the captured data events.

Among other things, the sorting of such captured data events according to timestamps associated with a predetermined clock, in connection with the subsequent display of the sorted data events on a graphical user interface, enables accurate and reliable determination of temporal and causal relationships between and among captured data events, notwithstanding that the displayed data events may be associated with multiple respective communication protocols.

At such time as the relationships between and among the displayed data events have been determined, an evaluation can then be made as to the causal relationship(s), if any, between and among various data events of interest. Among other things, such evaluations enable a user to trace an error back to a point of origin, as well as to determine the effects, if any, that a particular data event causes as that data event propagates through the communications network.

In this manner, the network administrator, hardware programmer, or other users can identify the source of data corruption, alteration, or loss, or other problems that might be experienced in data networks that use different transmission mechanisms and communication protocols.

I. Exemplary Operating Environment

Figure 1:
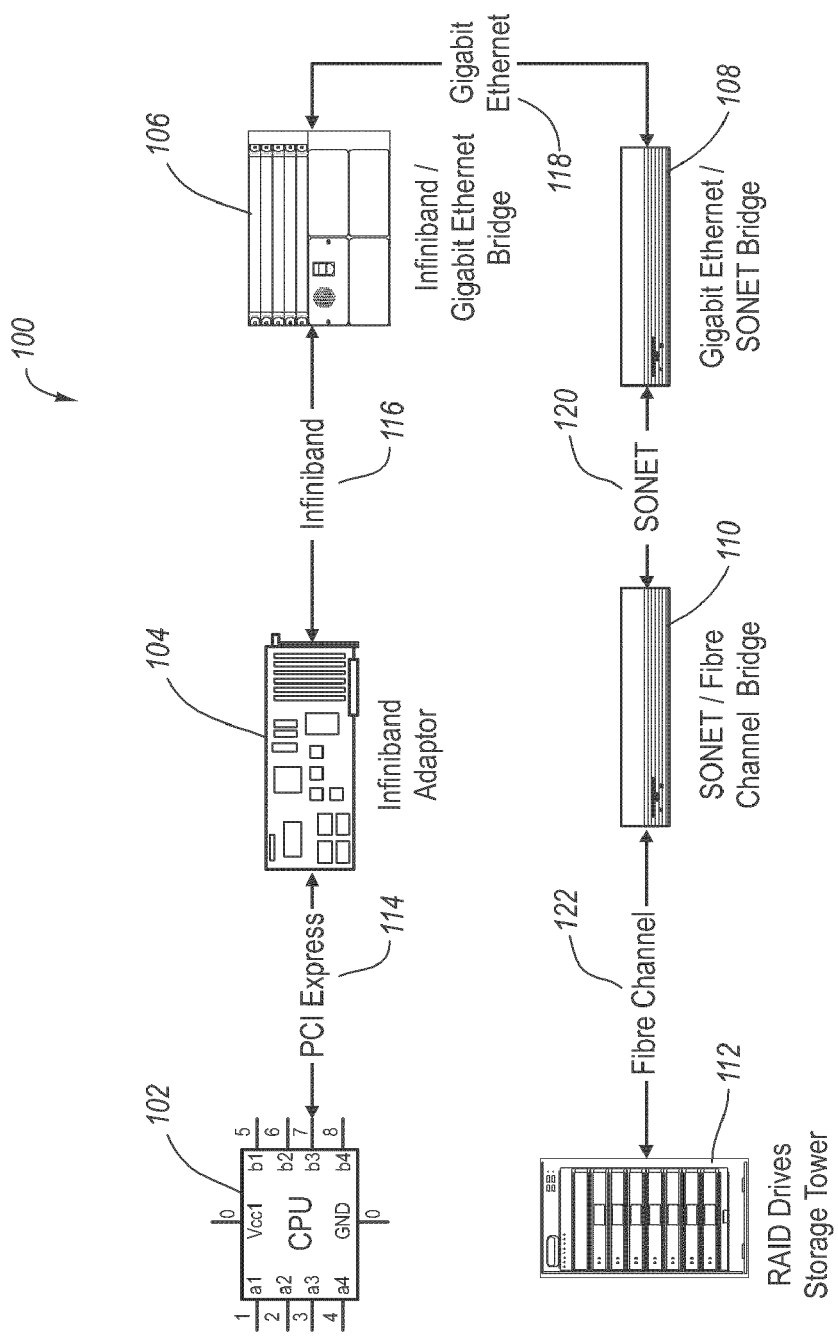
FIG. 1 is a schematic diagram that illustrates aspects of an exemplary data communications network that employs a variety of different data transmission mechanisms and protocols.

With attention now to FIG. 1, details are provided concerning an exemplary operating environment wherein the systems and methods disclosed herein may be employed. In the illustrated arrangement, the operating environment takes the form of a communications system 100 wherein data is transferred between a central processing unit ("CPU") of a computing device and a redundant array of independent disks ("RAID") system. The illustrated communications system 100 is an exemplary operating environment only however and the systems and methods disclosed herein may, more generally, be employed in any other operating environment(s) where such functionality may prove useful.

In the illustrated arrangement, the communications system 100 includes a CPU 102 of a computing device (not shown) configured and arranged for serial communication with an Infiniband adapter 104, an Infiniband/GigE bridge 106, a GigE/synchronous optical network ("SONET") bridge 108, a SONET/Fibre Channel bridge 110, and a RAID drive storage tower 112. Serial connections between these components are provided by a series of communications links. In particular, the CPU 102 and Infiniband adapter 104 are connected by a peripheral component interconnect ("PCI") Express link 114. Downstream of the Infiniband adapter 104, an Infiniband link 116 connects the Infiniband adapter 104 with the Infiniband/GigE bridge 106. In similar fashion, a GigE link 118 connects the Infiniband/GigE bridge 106 with the GigE/SONET bridge 108, while the SONET link 120 connects the GigE/SONET bridge 108 with the SONET/Fibre Channel bridge 110. Finally, a Fibre Channel link 122 connects the SONET/Fibre Channel bridge 110 with the RAID drive storage tower 112.

Each of the aforementioned links conforms with a protocol that has particular strengths and functionality that make the link well suited for use in particular environments. For example, the PCI Express link 114 comprises a high speed, inexpensive short-haul connection, while the Infiniband link 116 employs a high-bandwidth protocol that is useful in data center transmissions. Further, where it is desired to transmit data across an enterprise LAN, the GigE link 118 is often effective. The SONET link 120 is particularly well adapted for high bandwidth, long haul applications. Finally, the Fibre Channel link 122 enables data transmission to high performance disk drive storage systems such as the RAID drive storage tower 112.

As the foregoing suggests, the communications system 100, as well as other operating environments, comprises a variety of different communications links, systems and devices conforming with any number of communications protocols. Such arrangements are useful because they enable users to more fully exploit the relative strengths of the various communications protocols.

Figure 2:
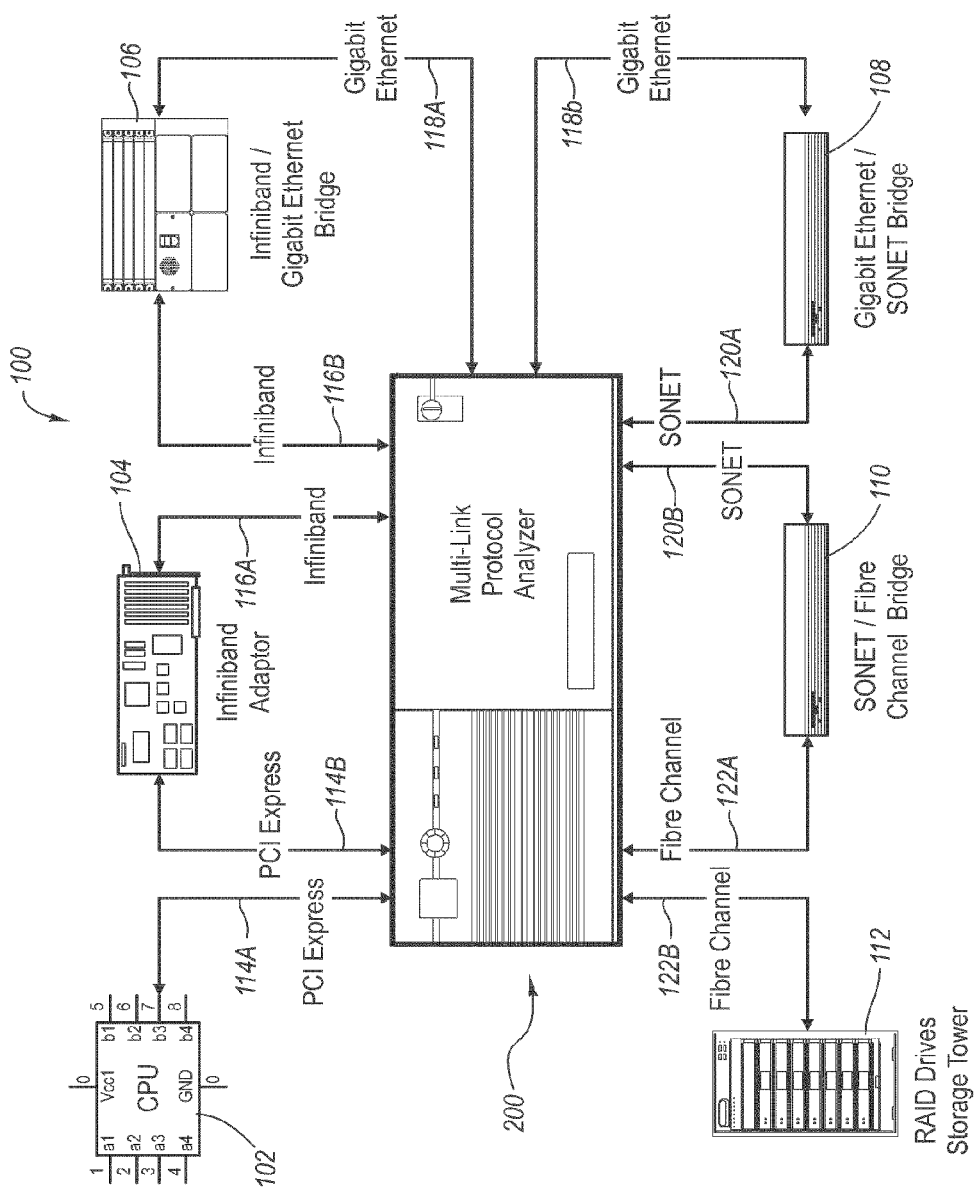
FIG. 2 is a high level schematic diagram of a protocol analyzer such as may be employed in connection with a communications network.

Directing attention now to FIG. 2, details are provided concerning a multi-link protocol analyzer, or simply "analyzer," 200 suitable for use in connection with the communications network 100, or other operating environment. As indicated in FIG. 2, the analyzer 200 is disposed in an in-line arrangement with respect to each of the components in the communications network 100. In particular, the PCI Express links 114A and 114B enable routing of data from the CPU 102 through the analyzer 200 to the Infiniband adapter 104. As suggested in FIG. 2, the Infiniband links 116A and 116B, GigE links 118A and 118B, SONET links 120A and 120B, and Fibre Channel links 122A and 122B likewise enable routing of data through the analyzer 200 and on to the next link in the series.

Thus arranged, the protocol analyzer 200 receives data traffic from each of the links in the communications network. The illustrated arrangement is exemplary only however and is not intended to limit the scope of the invention. For example, in some implementations, the protocol analyzer 200 receives data from less than all the links in the communications system 100. Moreover, the protocol analyzer 200 need not be positioned in an in-line configuration in every case. Accordingly, in some implementations, the protocol analyzer 200 is configured and arranged to receive network data from a tap, or taps, on one or more of the links. More generally, the protocol analyzer 200 can be arranged in any way, relative to the communications network 100, that is consistent with the functionality disclosed herein. In yet other cases, multiple protocol specific link analyzers are employed in place of a single multi-link protocol analyzer.

II. Exemplary Protocol Analyzers

As the foregoing discussion suggests, embodiments of the protocol analyzer may be configured in a variety of different ways. With attention now to FIG. 3, details are provided concerning an exemplary link analyzer 300 design configured to implement aspects of the functionality disclosed herein. The illustrated link analyzer 300 is one example of a protocol specific link analyzer that may be included as a component of a multi-link protocol analyzer.

In the illustrated embodiment, the link analyzer 300 includes a serializer/deserializer ("SERDES") 302 configured to receive and transmit network traffic by way of a communications link (not shown) of a communications system. Generally, the SERDES 302 is synchronized with the transmitted clock on the input link. The link analyzer 300 further includes an analyzer front end 304 and analyzer back end 306. Note that as used herein, "network" and "communications system" refer to any system concerned in any way with the communication of data.

Figure 3:
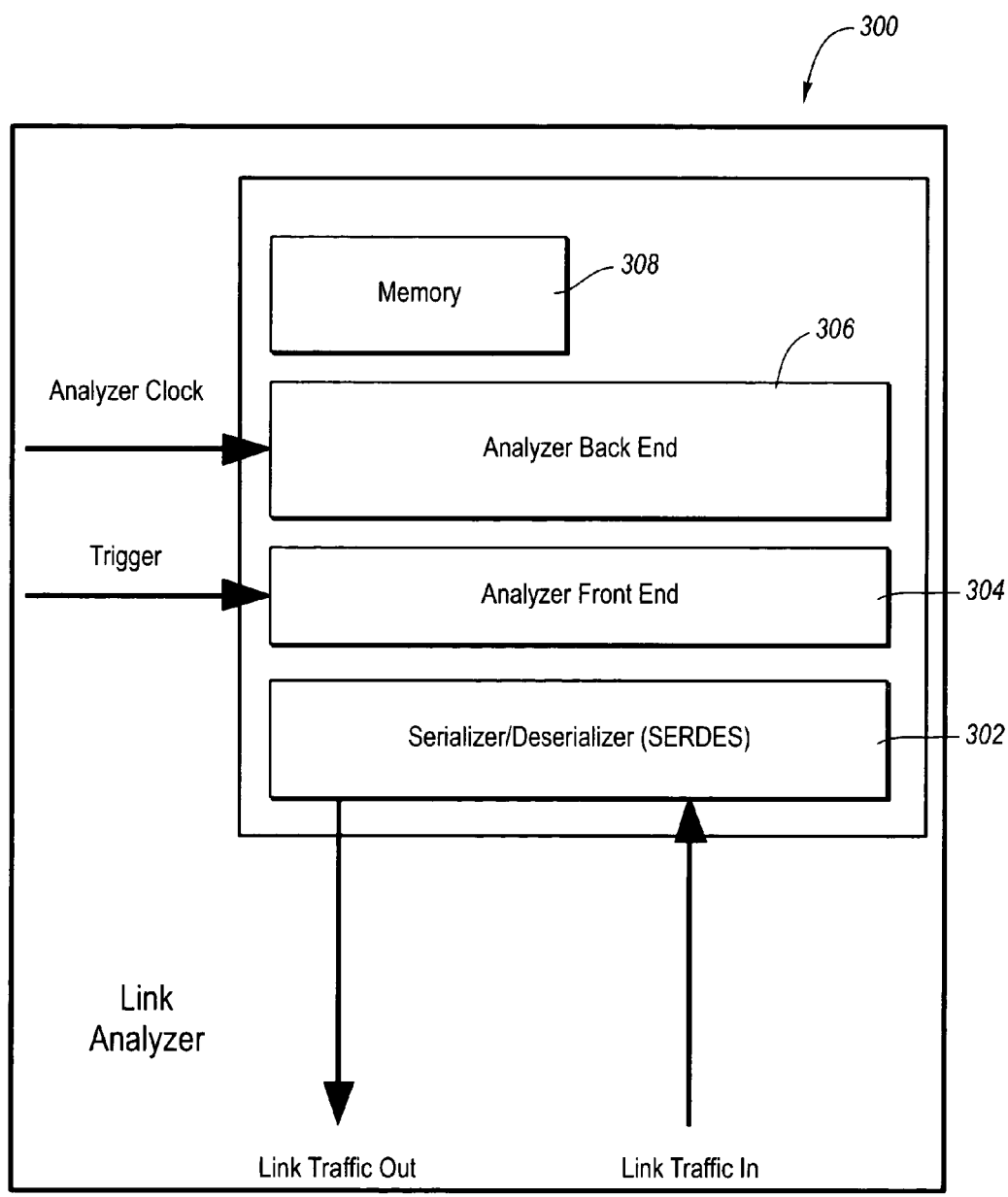
FIG. 3 is a schematic diagram of an exemplary multi-link protocol analyzer.

As indicated in FIG. 3, the analyzer front end 304 is configured to receive a "trigger" signal, such as from another link analyzer. Additionally, and as disclosed elsewhere herein, the analyzer front end 304 may also generate and transmit a "trigger" signal in some cases. In similar fashion, the analyzer back end 306 is configured to receive an analyzer clock, which may also be referred to herein as a "reference clock," such as from another link analyzer. As disclosed elsewhere herein, the analyzer back end 306 may also generate and transmit the analyzer clock in some cases.

Finally, the link analyzer 300 includes a memory 308. Generally, the memory 308 enables the link analyzer 300 to store captured data events and other information and materials that relate to the communications link(s) with which the link analyzer 300 is associated.

Figure 4:
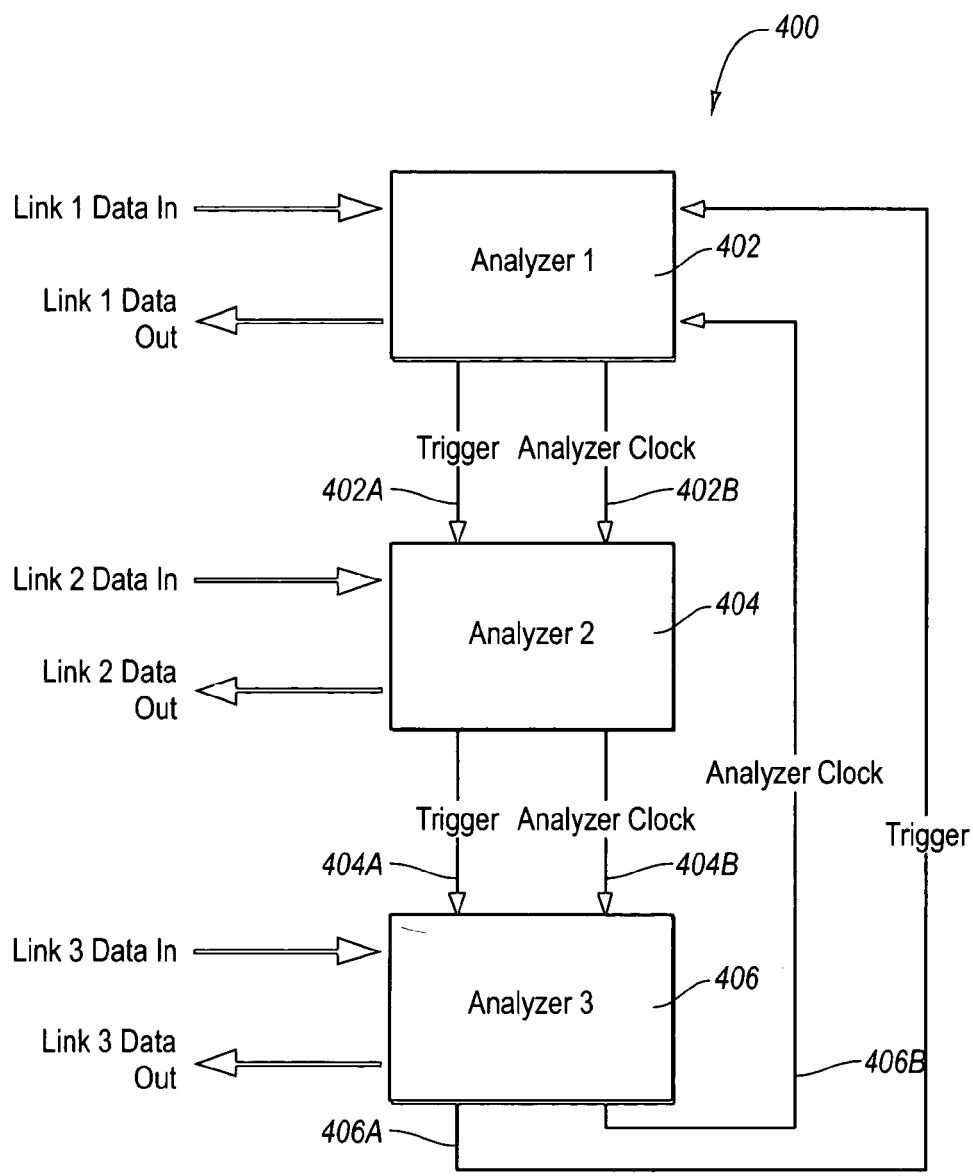
FIG. 4 is a schematic diagram illustrating relationships between a protocol analyzer and various data transmission mechanisms employed in an exemplary data communications network.

Directing attention now to FIG. 4, and with continuing reference to FIG. 3, more particular details are provided concerning an exemplary implementation of a multi-link protocol analyzer denoted generally at 400 in FIG. 4. Generally, the multi-link protocol analyzer 400 serves to monitor multiple communication links while maintaining a common time base that permits synchronization or time wise correlation of the timestamps created when the data is captured from the multiple links. Additionally, the multi-link protocol analyzer 400 captures and analyzes data events.

To these ends, the multi-link protocol analyzer 400 includes hardware that is configured to receive and capture data events associated with various transmission protocols. Such hardware includes one or more pairs of ports, each of which is configured and arranged to interface with a bi-directional communication link. The multiple multi-link protocol analyzer 400 also includes hardware and/or software that is adapted to recognize the occurrence of predefined events in the data received by way of the various bi-directional communication links.

As indicated in FIG. 4, and noted earlier herein, the multi-link protocol analyzer 400 includes multiple protocol specific devices, or link analyzers, which may also be referred to as cards, blades, boxes, or other devices. Generally, each of such devices is adapted for use with a data stream corresponding to a particular protocol and may be implemented in a modular or interchangeable form so as to permit the multi-link protocol analyzer 400 to be modified or adapted for use with various types of communications systems.

In the particular implementation illustrated in FIG. 4, the multi-link protocol analyzer 400 includes a first link analyzer 402, a second link analyzer 404 and a third link analyzer 406 arranged in series with each other. Exemplarily, each of the link analyzers 402, 404 and 406 is configured for use in connection with a different communications protocol.

The link analyzer 402 is arranged in an in-line configuration so as to receive data from a communications link "1" input, and to pass the received data to a corresponding communications link "1" output. As disclosed in further detail elsewhere herein, the received link "1" data is examined by the link analyzer 402 for the presence of one or more trigger conditions which, if detected by the link analyzer 402, cause the generation and transmission of a trigger signal 402A to the link analyzers 404 and 406.

Contemporaneously with generation and transmission of the trigger signal 402A, some implementations of the link analyzer 402 generate and transmits an analyzer, or reference, clock signal 402B. The analyzer clock, or "reference clock," signal 402B is protocol independent and serves as a common base or reference for the timestamping of data events captured in connection with the occurrence of one or more triggering events. As used herein, "reference clock" refers to a clock that may be defined with reference to, or based upon, one or more transmission protocols and associated transmission protocol clocks employed in the same system as the reference clock, but which is nonetheless distinct and different from any of such protocol clocks.

Systems and methods for the definition of such a reference clock are disclosed and claimed in U.S. patent application Ser. No. 10/764,095, and entitled SYSTEMS AND METHODS FOR DEFINITION AND USE OF A COMMON TIME BASE IN MULTI-PROTOCOL ENVIRONMENTS, filed the same day herewith and incorporated herein in its entirety by this reference.

While some embodiments of the invention are implemented in connection with a reference clock, the scope of the invention is not so limited. Rather, other embodiments of the invention use one of the protocol clocks as a basis for capturing and timestamping data events of interest.

As further indicated in FIG. 4, the link analyzer 402 is also configured to receive, either directly or indirectly, a trigger signal and analyzer clock signal from the link analyzer 406. The link analyzers 404 and 406 are similarly configured to transmit and receive trigger and analyzer clock signals. Further, the operation of link analyzers 404 and 406 concerning link "2" data and link "3" data, respectively, is analogous to the operation of link analyzer 402 with respect to link "1" data.

Thus, for example, in the event that the link analyzer 404 detects a trigger condition in the link "2" data, the link analyzer 404 generates and transmits trigger 404A and analyzer clock 404B. In like fashion, if the link analyzer 406 detects a trigger condition in the link "3" data, the link analyzer 406 generates and transmits trigger 406A and analyzer clock 406B.

It should be noted that while the link analyzers 402, 404 and 406 are shown in FIG. 4 as being arranged in serial fashion, the scope of the invention is not so limited. In some implementations, the link analyzers 402, 404 and 406 are arranged so that a trigger and/or clock signal generated by one analyzer is propagated in parallel to the other link analyzers in the system.

III. Exemplary Protocol Analyzer Operations

Figure 5:
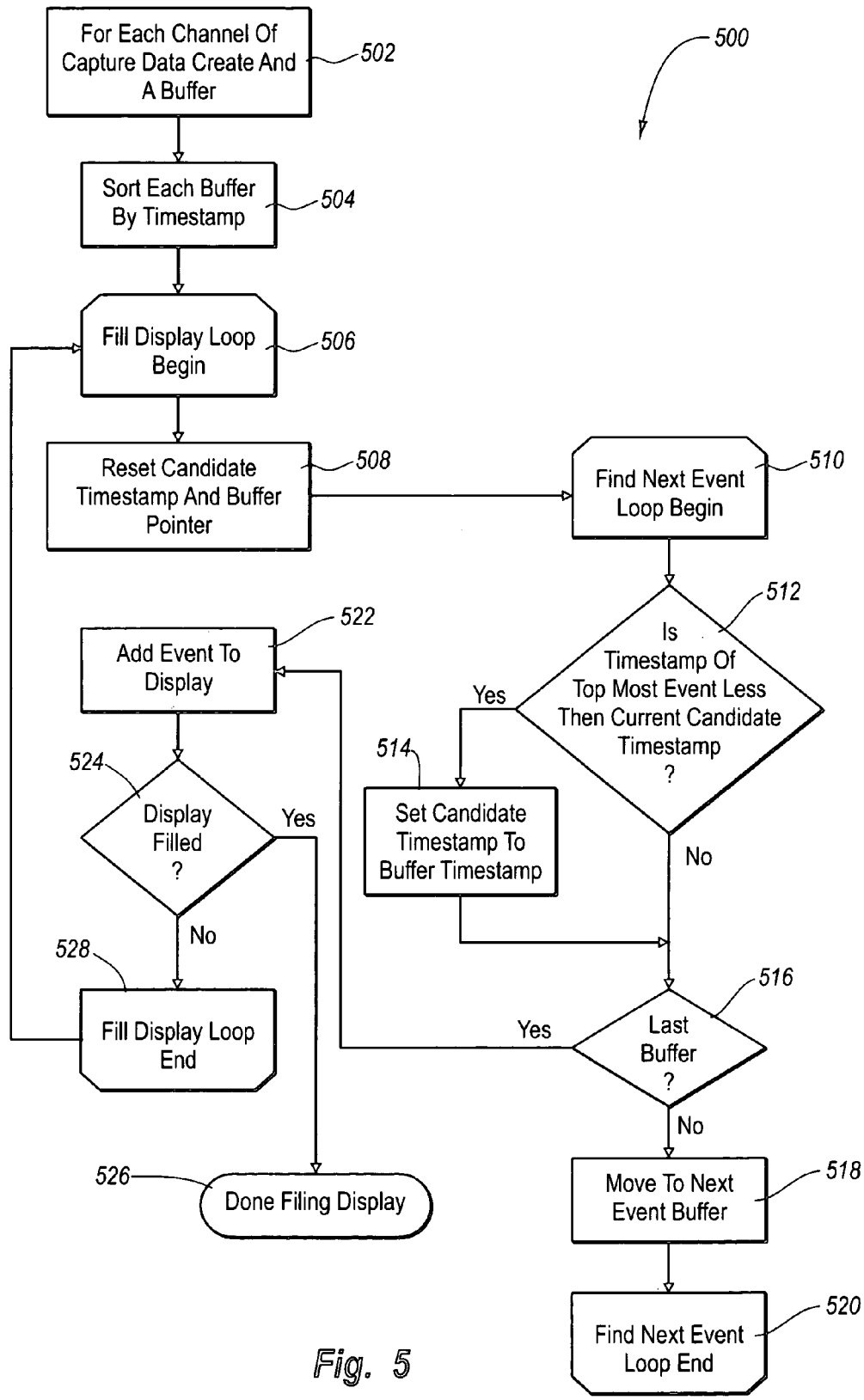
FIG. 5 is a flow diagram illustrating a process for the time sorted display of captured data events that collectively represent multiple protocols.

Directing attention to FIG. 5, and with continuing reference to FIG. 3, details are provided concerning a process 500 for handling link data. In general, the process 500 involves loading data events, which typically correspond to a variety of different communications protocols, into parallel buffers that are then sorted by timestamp. A display of the data events is populated by looping through each of the buffers to determine which buffer has the lowest timestamp. The data event in the buffer having the lowest timestamp is then added to the display. In this way, the captured data events are ordered in time and displayed in chronological fashion on the GUI, discussed below, notwithstanding the fact that captured and displayed data events correspond to a variety of different communication protocols.

With more particular attention now to FIG. 5, the process 500 commences at stage 502 where a buffer is created for each channel and filled with data captured from the corresponding channel. Thus, in a communications system including, for example, Infiniband, GigE and SONET communication links, three data buffers would be created, namely, an Infiniband buffer, a GigE buffer, and a SONET buffer. At the time the data events are captured, a timestamp is assigned to each captured data event. The timestamp may be made in association with a reference clock or, alternatively, in association with a selected protocol clock.

In connection with the capture and timestamping of the various data events, various types of information may be associated with the events so as to facilitate subsequent time based sorting and analysis of the captured data events. For example, in at least some implementations of the invention, channel number and protocol information is also identified and associated with each captured data event. As suggested in the discussion, below, of the exemplary GUI illustrated in FIG. 6, various other types of information may be associated with the captured data events as well. The scope of the invention is not limited, however, to the association and/or display of any particular combination or type of data event information. More generally, any of a variety of different data event information types and combinations may be employed.

With continuing attention now to FIG. 5, the process 500 next advances to stage 504 where the various buffers, also referred to herein as "channel buffers," are sorted according to the timestamps assigned at stage 502 of the process. In this way, the channel buffers are chronologically ordered and the system is ready to begin filling a display, such as the GUI illustrated in FIG. 6, with information concerning the captured data events. Accordingly, the "fill display" loop is then commenced, as indicated by the "fill display loop begin" marker 506.

In particular, the candidate timestamp and buffer pointer are reset at stage 508 and the "find next event" loop begins, as indicated by the "find next event loop begin" marker 510. Note that the loop commencing at the "fill display loop begin" marker 506 is initially skipped when the process 500 commences for the first time, but is included after the "find next event" loop, indicated by the "find next event loop begin" marker 510, has run once.

Once the "find next event" loop begins, the process 500 advances to stage 512 where a determination is made as to whether the timestamp of the topmost data event is less than the timestamp of the current candidate timestamp. If the timestamp of the topmost data event is less than, that is, occurs earlier in time than, the timestamp of the) current candidate timestamp, then the process advances to stage 514 where the an candidate timestamp is set to the buffer timestamp. On the other hand, if the timestamp topmost data event is later than the timestamp of the current candidate timestamp, then the process advances to stage 516. Likewise, if the candidate timestamp is set to the buffer timestamp at stage 514, the process 500 also then advances to stage 516.

At stage 516, a determination is then made as to whether the last buffer in the group of channel buffers has been evaluated. If the last buffer has not been evaluated, the process increments to the remaining channel buffer(s), as indicated by stage 518. As indicated by the "find next event loop end" marker 520, the "find next event" loop ends and loops back, as indicated by the "find next event loop begin" marker 510, so that the next channel buffer can be evaluated, as described earlier.

In the event that a determination is made at stage 516 that the last buffer has been evaluated, the process 500 advances to stage 522 where the most recent data event is added to a planned, or actual, display of data events. At stage 524, a determination is made as to whether the display has been filled with data events. If so, the process terminates at stage 526 where filling of the display is complete. If the display does not become filled as the result of the addition of the data event at stage 522, the "fill display" loop ends, as indicated by the "fill display loop end" marker 528. The "fill display" loop then begins again, as indicated by the "fill display loop begin" marker 506.

IV. User Interfaces

As suggested in the discussion of FIG. 5 above, information concerning captured data events is graphically displayed so as to enable a user to implement troubleshooting and analysis of the communications network. In this regard, a graphical user interface ("GUI") is provided that is generally configured to display time sorted data events from multiple channels, or links, where each of the links may correspond to a different communications protocol. One embodiment of such a GUI is generally designated at 600 in FIG. 6.

Figure 6:
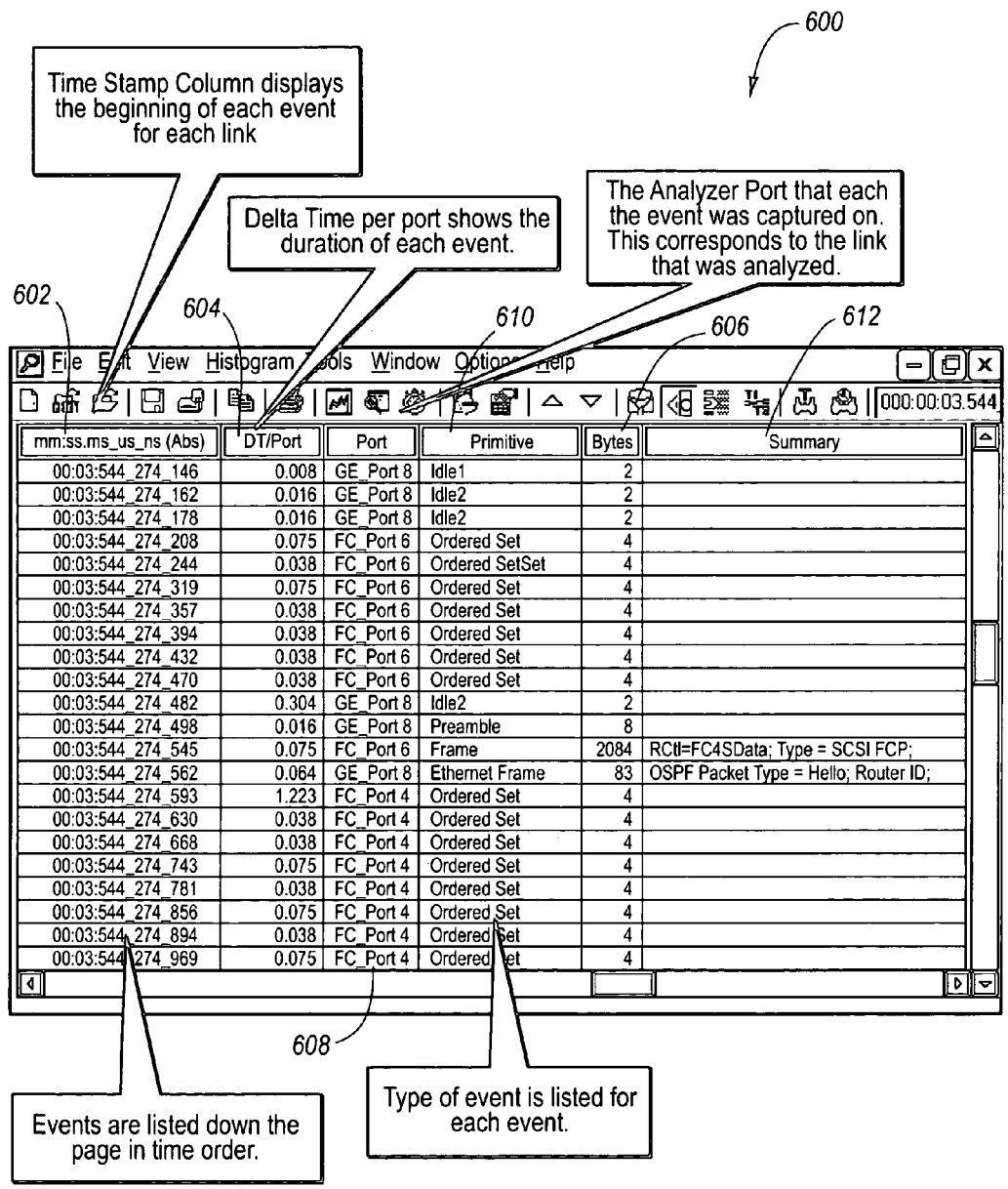
FIG. 6 is an illustration of an exemplary graphical user interface suited for presenting a time sorted display of captured data events.

As indicated in FIG. 6, the GUI 600 enables the display of the multi-protocol data such that data events associated with the various protocols employed in the communications system are presented in the same view. In the illustrated implementation, the GUI 600 also illustrates time data, such as clock timestamp information, for each of the listed events so that the user can quickly identify the temporal relationship(s) between and among displayed data events.

The exemplary GUI 600 of FIG. 6 displays the data event information in a tabular format, with the various data events appearing in chronological order. Of course, the type, amount and format of data displays implemented in connection with the GUI may be varied as necessary to suit a particular situation or requirement. Accordingly, the scope of the invention should not be construed to be limited to any particular implementation of a GUI.

In the illustrated exemplary embodiment, the data displayed in connection with the GUI 600 includes a combination of Gigabit Ethernet and Fibre Channel events. Each row of the graphical user interface of FIG. 6 is associated with a single data event. Moreover, the data events captured on the different data links are interleaved and sorted on the GUI 600 by the clock timestamp. Consequently, the temporal relationships, at least, between and among captured data events are readily apparent.

More particularly, embodiments of the GUI enable the user to reliably sort captured data events and to identify temporal and causal relationships between and among the captured and displayed data events. This functionality is particularly useful in complex operating environments such as multi-protocol communications systems where multiple data event captures occur in connection with a variety of different data links and communication protocols.

With more particular reference now to FIG. 6, the timestamp column 602 displays the beginning clock time of the data events listed in each row. Among other things, this information enables the user to identify overlap and other aspects of relationship(s) between the different displayed data events.

A delta time column 604 is also presented by the GUI 600 and displays the delta time for each data event row. As used herein, the "delta time" refers to the elapsed clock time between the start and finish of a particular data event detected on a port of the protocol analyzer. In addition to the delta time column 604, the GUI 600 includes a byte length column 606 that indicates the length of the data in the data event, measured in bytes. However, other measurements may alternatively be employed.

The GUI 600 further includes a port column 608 that identifies the port of the protocol analyzer that captured the listed data event. The ports identified in the port column 608 correspond to the links that are monitored using the protocol analyzer. Additionally, a protocol primitive column 610 is also displayed that specifies the protocol primitive that the particular data event represents. Among other things, the identity of the protocol primitive helps the user understand the content or the identity of the data that has been captured.

Finally, the exemplary GUI 600 displays a summary column 612 that includes summary information, descriptive information, or any other desired information associated with the data event. The protocol analyzer generates descriptive information that further assists the user in identifying the characteristics, source, or cause of any problems that might be experienced in the system under test. More particularly, exemplary embodiments of the protocol analyzer automatically determine the contents of the summary column 612 based upon the communication protocol of the data event in a particular row, and the protocol analyzer then displays that information by way of the GUI. In this way, protocol specific information for each listed data event is presented to the user in the summary column 612 of the GUI 600.

Although FIG. 6 illustrates one example of a GUI capable of displaying data events and corresponding timestamp information in a way that enables identification of the temporal and causal relationships between data events, the scope of the invention is not so limited. More generally, implementations of the GUI may be configured to display a wide variety of data event information in any number of different arrangements.

Moreover, implementations of the GUI and associated software are configured to facilitate implementation of functionality such as the storage, retrieval, modification and display of protocol specific information so that a user can readily modify the display, such as by adding new communication protocols in connection with which captured data events are desired to be displayed. In similar fashion, the user can also delete protocols that are no longer in use or that are not intended to be analyzed. Such flexibility makes embodiments of the invention well suited for use in dynamic environments such as communication systems where hardware and software are in a constant state of change as the result of ongoing advances in technology.

V. Analyses Based on Time Sorted Data Events

Figure 7:
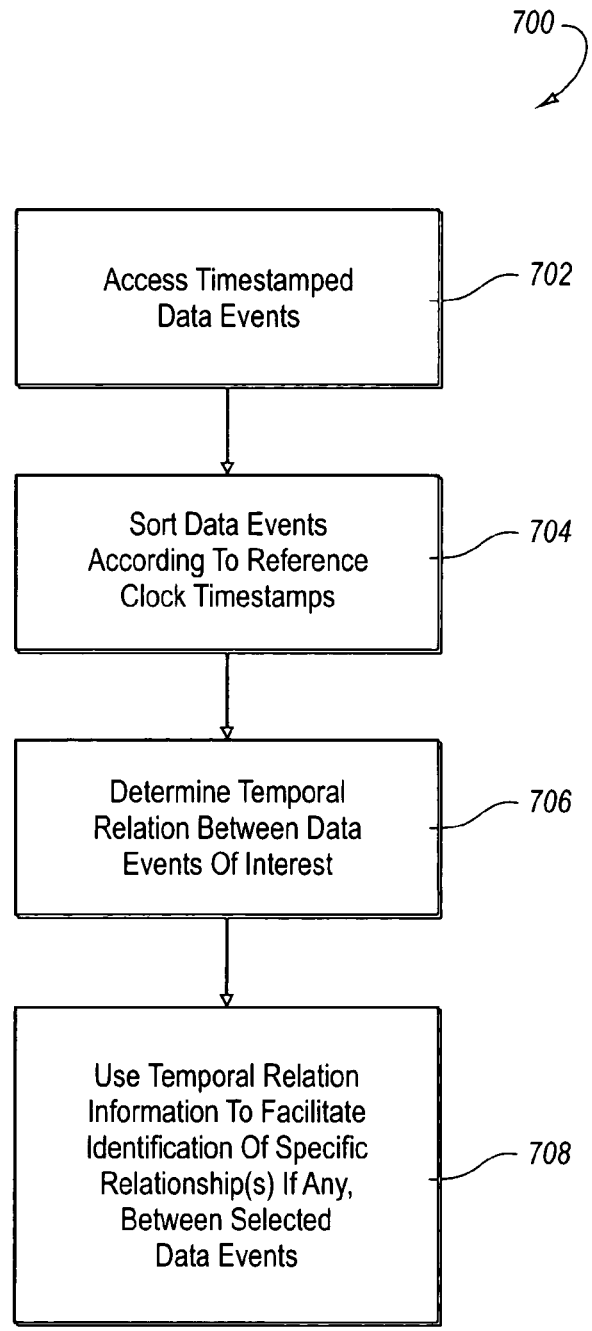
FIG. 7 is a flow diagram illustrating a process for using a display of time sorted data events to facilitate analysis of captured data events.

With attention now to FIG. 7, aspects of an exemplary process 700 for the handling of timestamped data events are indicated. In general, the process 700 is concerned with the performance of analyses concerning time sorted data events captured from multiple channels, or links, where the links collectively represent multiple different communications protocols. As discussed earlier, the display of such time sorted data events and related information is implemented in connection with a GUI so that a user, viewing the GUI, has a basis for evaluating various aspects of the displayed data events.

With particular reference now to the illustrated process, the timestamped data events stored in one or more channel buffers, or elsewhere, are displayed by the GUI at stage 702. The type, amount and format of data to be displayed may be preset in the GUI, or may be user defined, or may comprise a combination of GUI presets and user preferences.

The process 700 then advances to stage 704 where the user defines temporal relationships between and among some or all of the displayed data events. Examples of such temporal relations include, among others, whether one data event preceded or followed another data event, whether two or more data events overlap, and whether two or more data events commenced and concluded substantially simultaneously. Accordingly, in some cases, such determinations involve reviewing the time stamp column of the GUI to determine whether a particular event, or events, occurred before, during, or after another event or events. Moreover, data event parameters such as start time, stop time, and duration can also be readily determined both in absolute terms, and relative to parameters of other data events.

Once the temporal relationships between and among the various data events of interest have been determined, the process advances to stage 706 where the temporal relation information is used to facilitate identification of aspects of the specific nature of the relationship(s) between and among selected data events. For example, if it is determined that data event "A" started and concluded prior to the start of data event "B," it could be inferred that the occurrence of data event "A" was the cause of the occurrence of data event "B," and/or a conclusion could also be drawn that data event "B" was not the cause of data event "A."

As another example, if data event "C" overlaps data event "D," it could be concluded that at least the portion of data event "C" that occurred after the start of data event "D" could not have been the initial cause of data event "D." In this way, at least part of data event "C" can be eliminated as a possible trigger or cause of data event "D."

As suggested by the foregoing examples, sorting of data events by reference clock timestamp enables, among other things, various troubleshooting and analysis processes. Of course, the foregoing examples are not intended to limit the scope of the invention in any way. Rather, information obtained in connection with the use of a reference clock concerning the temporal relation, or relations, between and among selected data events such as communications network conditions, data errors or other occurrences, may be used to make, or facilitate the making of, a variety of other determinations as well with respect to relationship(s) between and among selected data events.

VI. Computing Environments, Hardware and Software

In at least some cases, some or all of the functionality disclosed herein may be implemented in connection with various combinations of computer hardware and software. For example, at least some protocol analyzers use hard coded devices such as field programmable gate arrays ("FPGA") to implement timestamping, data sorting and data capture functionality. Other protocol analyzers employ both hardware and software to implement various functions disclosed herein.

With respect to computing environments and related components, at least some embodiments of the present invention may be implemented in connection with a special purpose or general purpose computer that is adapted for use in connection with communications systems. Embodiments within the scope of the present invention also include computer-readable media for carrying or having computer-executable instructions or electronic content structures stored thereon, and these terms are defined to extend to any such media or instructions for use with devices such as, but not limited to, link analyzers and multi-link protocol analyzers.

By way of example such computer-readable media can comprise RAM, ROM, EEPROM, CD-ROM or other optical disk storage, magnetic disk storage or other magnetic storage devices, or any other medium which can be used to carry or store desired program code in the form of computer-executable instructions or electronic content structures and which can be accessed by a general purpose or special purpose computer, or other computing device.

When information is transferred or provided over a network or another communications connection (either hardwired, wireless, or a combination of hardwired or wireless) to a computer or computing device, the computer or computing device properly views the connection as a computer-readable medium. Thus, any such a connection is properly termed a computer-readable medium. Combinations of the above should also be included within the scope of computer-readable media. Computer-executable instructions comprise, for example, instructions and content which cause a general purpose computer, special purpose computer, special purpose processing device, such as link analyzers and multi-link protocol analyzers, or computing device to perform a certain function or group of functions.

Although not required, aspects of the invention have been described herein in the general context of computer-executable instructions, such as program modules, being executed by computers in network environments. Generally, program modules include routines, programs, objects, components, and content structures that perform particular tasks or implement particular abstract content types. Computer-executable instructions, associated content structures, and program modules represent examples of program code for executing aspects of the methods disclosed herein.

The described embodiments are to be considered in all respects only as exemplary and not restrictive. The scope of the invention is, therefore, indicated by the appended claims rather than by the foregoing description. All changes which come within the meaning and range of equivalency of the claims are to be embraced within their scope.

What is claimed is:

1. A method for processing data events captured in a multi-protocol communications system, the method comprising:
capturing first data events at a first link analyzer, the first link analyzer being disposed in an in-line arrangement with respect to a first data stream corresponding to a first communication protocol;
capturing second data events at a second link analyzer, the second link analyzer being disposed in an in-line arrangement with respect to a second data stream corresponding to a second communication protocol that is different from the first communication protocol;
generating a clock at the first link analyzer;
timestamping the first data events with timestamps using the clock as a reference;
propagating the clock from the first link analyzer to the second link analyzer;
timestamping the second data events with timestamps using the propagated clock as a reference;
sorting at least some of the first captured data events with respect to at least some of the second captured data events according to the respective clock timestamps associated with each of the first and second captured data events; and
displaying at least some of the sorted data events by way of a graphical user interface.

2. The method as recited in claim 1, wherein the displayed data events represent at least two different communication protocols selected from the group consisting of: Infiniband; Gigabit Ethernet; SONET; Fibre Channel; and PCI Express.

3. The method as recited in claim 1, wherein the clock is one of: a reference clock; and a protocol clock.

4. The method as recited in claim 1, wherein the displayed data events are presented on the graphical user interface such that a temporal relationship between at least two of the displayed data events is apparent from the display.

5. The method as recited in claim 4, wherein the temporal relationship comprises one of the following: a first data event preceded by a second data event; a first data event followed by a second data event; a first data event overlapped by a second data event; and a first data event and second data event commenced simultaneously and also concluded simultaneously.

6. The method as recited in claim 4, further comprising using information concerning the temporal relationship to facilitate determination of whether or not a causal relationship exists between the at least two sorted data events.

7. The method as recited in claim 1, further comprising displaying information concerning at least some of the displayed data events, wherein the displayed information includes at least one of: a data event start time; a data event stop time; a data event delta time; a data event type; an analyzer port in connection with which a data event was captured; a timestamp value; and a protocol type.

8. A method for processing data events associated with a multi-protocol communications system, the method being suitable for use in connection with a multi-link protocol analyzer and comprising:
capturing first data events at a first link analyzer, the first link analyzer being disposed in an in-line arrangement with respect to a first data stream corresponding to a first communication protocol;
capturing second data events at a second link analyzer, the second link analyzer being disposed in an in-line arrangement with respect to a second data stream corresponding to a second communication protocol that is different from the first communication protocol;
generating a clock at the first link analyzer;
timestamping the first data events with timestamps using the clock as a reference;
propagating the clock from the first link analyzer to the second link analyzer;
timestamping the second data events with timestamps using the propagated clock as a reference;
sorting at least some of the first captured data events with respect to at least some of the second captured data events according to the respective clock timestamps associated with each of the first and second captured data events; and
displaying at least some of the sorted data events by way of a graphical user interface such that a temporal relationship between at least two of the displayed data events is apparent from the display.

9. The method as recited in claim 8, wherein the displayed data events represent at least two different communication protocols selected from the group consisting of: Infiniband; Gigabit Ethernet; SONET; Fibre Channel; and PCI Express.

10. The method as recited in claim 8, wherein the clock is one of: a reference clock; and a protocol clock.

11. The method as recited in claim 8, wherein the temporal relationship comprises one of the following: a first data event preceded by a second data event; a first data event followed by a second data event; a first data event overlapped by a second data event; and a first data event and second data event commenced simultaneously and also concluded simultaneously.

12. The method as recited in claim 8, further comprising determining whether a causal relationship exists between at least two displayed data events based upon the temporal relation between the at least two displayed data events.

13. The method as recited in claim 8, further comprising displaying information concerning at least some of the displayed data events, wherein the displayed information includes at least one of: a data event start time; a data event stop time; a data event delta time; a data event type; an analyzer port in connection with which a data event was captured; a timestamp value; and a protocol type.

14. A method for processing data events associated with a multi-protocol communications system, the method being suitable for use in connection with a multi-link protocol analyzer and comprising:
capturing first data events at a first link analyzer, the first link analyzer being disposed in an in-line arrangement with respect to a first data stream corresponding to a first communication protocol;
capturing second data events at a second link analyzer, the second link analyzer being disposed in an in-line arrangement with respect to a second data stream corresponding to a second communication protocol that is different from the first communication protocol;
capturing third data events at a third link analyzer, the third link analyzer being disposed in an in-line arrangement with respect to a third data stream corresponding to a third communication protocol that is different from the first and second communication protocols;
generating a clock at the first link analyzer;
propagating the clock from the first link analyzer to the second and third link analyzers;

timestamping the first, second, and third data events with timestamps using the clock propagated from the first link analyzer as a reference;

sorting at least some of the captured first captured data events with respect to at least some of the second data events according to the respective clock timestamps associated with each of the first and second captured data events; and displaying the sorted data events in a display by way of a graphical user interface such that a temporal relationship between at least two of the displayed data events is apparent from the display.

15. The method as recited in claim 14, wherein the displayed data events represent at least two different communication protocols selected from the group consisting of: Infiniband; Gigabit Ethernet; SONET; Fibre Channel; and PC1 Express.

16. The method as recited in claim 14, wherein the clock is one of: a reference clock; and a protocol clock.

17. The method as recited in claim 14, wherein the temporal relationship comprises one of the following: a first data event preceded by a second data event; a first data event followed by a second data event; a first data event overlapped by a second data event; and, a first data event and second data event commenced simultaneously and also concluded simultaneously.

18. The method as recited in claim 14, further comprising determining whether a causal relationship exists between at least two displayed data events based upon the temporal relation between the at least two displayed data events.

19. The method as recited in claim 14, further comprising displaying information concerning at least some of the displayed data events, wherein the displayed information includes at least one of: a data event start time; a data event stop time; a data event delta time; a data event type; an analyzer port in connection with which a data event was captured; a timestamp value; and a protocol type.

20. The method as recited in claim 14, wherein the clock is propagated in series from the first link analyzer to the second link analyzer and from the second link analyzer to the third link analyzer.

21. The method as recited in claim 14, wherein the clock is propagated in parallel from the first link analyzer to the second and third link analyzers.

22. A computer program product for implementing a method for processing data events captured in a multi-protocol communications system, the computer program product comprising:

physical storage computer readable medium storing computer executable instructions for performing the method, wherein the method comprises:

capturing first data events at a first link analyzer from a data stream corresponding to a first communication protocol;

capturing second data events at a second link analyzer from a data stream corresponding to a second communication protocol that is different from the first communication protocol;

timestamping the first data events with timestamps using a clock generated at the first link analyzer as a reference;

timestamping the second data events with timestamps using the clock generated at the first link analyzer as a reference;

sorting at least some of the captured first captured data events with respect to at least some of the second data events according to the respective clock timestamps associated with each of the captured first and second data events; and displaying at least some of the sorted data events by way of a graphical user interface such that a temporal relationship between at least two of the displayed data events is apparent from the display.

23. The computer program product as recited in claim 22, wherein the displayed data events represent at least two different communication protocols selected from the group consisting of: Infiniband; Gigabit Ethernet; SONET; Fibre Channel; and PCI Express.

24. The computer program product as recited in claim 22, wherein the clock is one of: a reference clock; and a protocol clock.

25. The computer program product as recited in claim 22, wherein the temporal relationship comprises one of the following: a first data event preceded by a second data event; a first data event followed by a second data event; a first data event overlapped by a second data event; and, a first data event and second data event commenced simultaneously and also concluded simultaneously.

26. The computer program product as recited in claim 22, wherein the method further comprises determining whether a causal relationship exists between at least two displayed data events based upon the temporal relation between the at least two displayed data events.

27. The computer program product as recited in claim 22, wherein the method further comprises displaying information concerning at least some of the displayed data events, wherein the displayed information includes at least one of: a data event start time; a data event stop time; a data event delta time; a data event type; an analyzer port in connection with which a data event was captured; a timestamp value; and, a protocol type.

* * * * *